C. E. RAGSDALE.
QUICK ACTING WRENCH.
APPLICATION FILED NOV. 18, 1907.
902,000.
Patented Oct. 27, 1908.
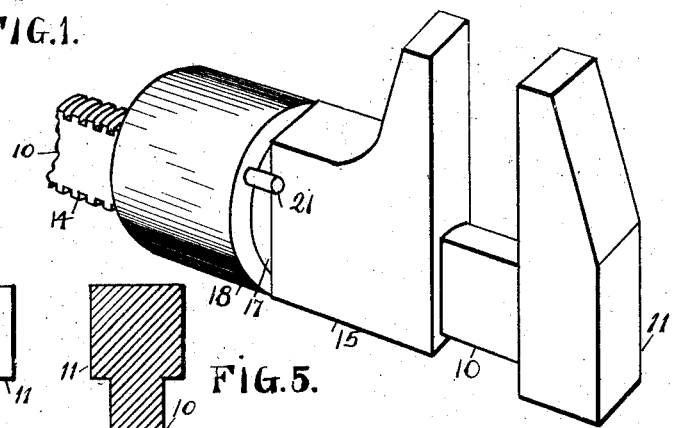
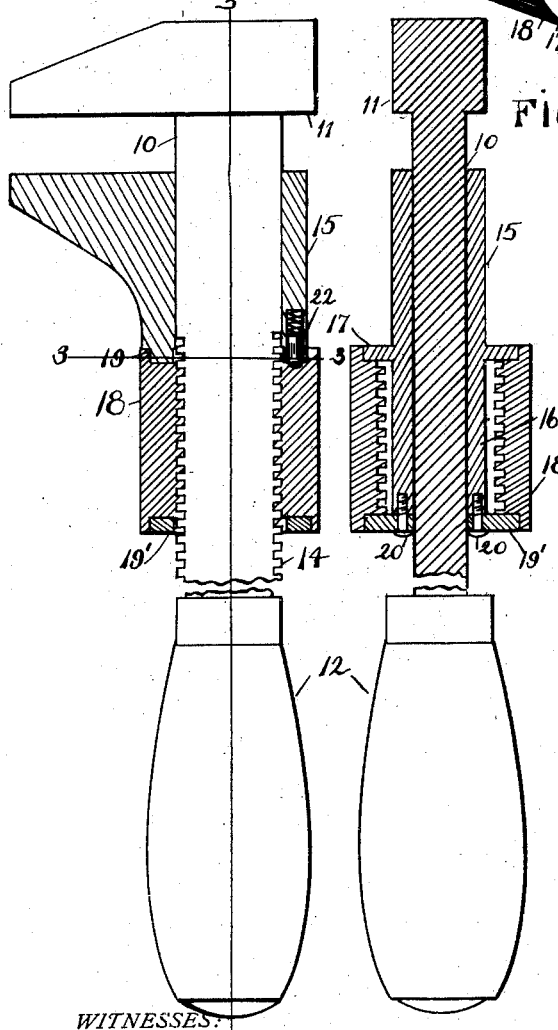
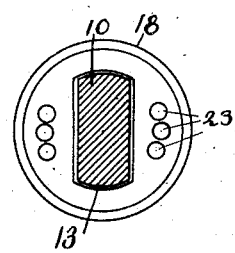
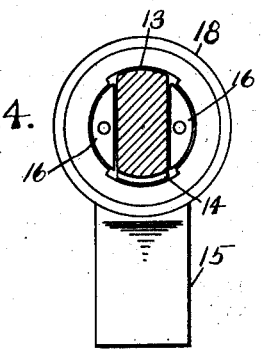
WITNESSES:
Howard Fuller
H. H. Hood
INVENTOR.
Claude E. Ragsdale
BY
Ernest K. Hood
His ATTORNEY.

UNITED STATES PATENT OFFICE.

CLAUDE E. RAGSDALE, OF TRAFALGAR, INDIANA.

QUICK-ACTING WRENCH.

No. 902,000.　　　　Specification of Letters Patent.　　　　Patented Oct. 27, 1908.

Application filed November 18, 1907. Serial No. 402,653.

*To all whom it may concern:*

Be it known that I, CLAUDE E. RAGSDALE, a citizen of Trafalgar, county of Johnson, State of Indiana, have invented certain new and useful Improvements in Quick-Acting Wrenches, of which the following is a specification.

I am aware of the fact that quick acting wrenches are in use but most of them possess certain mechanical defects which have precluded their general use.

The object of my invention is to provide a simple and inexpensive quick acting wrench which will draw on a nut after it has been brought up to position.

My invention consists in the combination and arrangement of parts hereinafter shown and described.

In the drawings Figure 1 is a perspective view of the wrench with handle and stem cut away. Fig. 2 a side elevation partially in section. Fig. 3 an end section on line 3—3. Fig. 4 a cross section of the nut and movable jaw. Fig. 5 a cross section on line 5—5.

Similar numerals refer to similar parts.

The numeral 10 represents a stem provided with a forged head 11 and a handle 12. Stem 10 is practically rectangular in cross section with the edge surface 13 formed of a quadrant of a circle whose diameter is equal to the width of the stem. In each edge of stem 10 I cut threads 14 to any desired pitch. Loosely mounted on stem 10 is a movable jaw 15 provided with two extensions 16 extending down along the stem 10 for a short distance. Jaw 15 is also provided with a ring 17 integral therewith.

The numeral 18 represents a nut. The end of the nut 18 is recessed as shown at 19 to go over the ring 17. The lower end of nut 18 is also recessed to take a washer 19' held to extensions 16 by means of screws 20. Nut 18 is provided on its inner periphery with threads on opposite quarters, the space between the threads being cut away enough to clear threads 14 on stem 10. It will thus be seen that the movable jaw carries this nut on the rings independent from the stem. In operation the nut is turned until the blank places come over the threads 14 thus allowing the jaw to slip up and down without any engagements with these threads. When the proper point is reached the nut is turned until the threads therein engage with threads 14 and by a further movement of this nut it will readily be seen that the movable jaw can be drawn upward the desired amount to tighten on a nut which depends upon the pitch of the thread. To limit the movement of this nut and locate its position I provide a pin 21 which strikes the movable jaw in another point when the threads are engaged. This of course limits definitely the movement of said nut. It may be desired however, in some cases to shift this nut more than the pin would allow and in cases of this kind I provide a spring detent 22 carried by movable jaw 17 which is adapted to take into small recesses 23 in the nut. When this is used pin 21 is left out. With this construction it will be seen that the nut can be turned completely around if so desired.

I am aware of the fact that wrenches are in use where the nut is carried by threads on the movable jaw. With wrenches of this kind, however, it is impossible to draw on a nut, and I do not claim any such construction.

I claim as my invention.

1. In a wrench the combination of a threaded stem 10; a movable jaw mounted thereon provided with extensions 16; a nut 18 surrounding said extensions and adapted to engage or disengage threads on stem 10; a ring 17 integral with the jaw and concentric with the nut; and a ring 19' secured to the lower end of extensions 16 and concentric with the nut said rings adapted to carry said nut, all arranged substantially as and for the purpose set forth.

2. In a wrench the combination of a threaded stem 10, a movable jaw mounted thereon provided with extensions 16; a nut 18 surrounding said extensions and adapted to engage or disengage threads on stem 10; a ring 17 integral with the jaw and concentric with the nut; and a ring 19' secured to the lower end of extensions 16 and concentric with the nut said rings adapted to carry said nut; a spring detent 22 carried by the jaw and adapted to take into recesses in nut 18; all arranged substantially as and for the purpose set forth.

CLAUDE E. RAGSDALE.

Witnesses:
 GEO. W. WATSON,
 OMER D. JOLLIFFE.